United States Patent
Datta et al.

(12) 
(10) Patent No.: US 7,269,143 B2
(45) Date of Patent: Sep. 11, 2007

(54) COMBINING ROUTERS TO INCREASE CONCURRENCY AND REDUNDANCY IN EXTERNAL NETWORK ACCESS

(75) Inventors: Sanchaita Datta, Salt Lake City, UT (US); Bhaskar Ragula, Salt Lake City, UT (US)

(73) Assignee: Ragula Systems (FatPipe Networks), Salt Lake City, UT (US)

( * ) Notice: Subject to any disclaimer, the term of this patent is extended or adjusted under 35 U.S.C. 154(b) by 1137 days.

(21) Appl. No.: 10/263,497

(22) Filed: Oct. 2, 2002

(65) Prior Publication Data

US 2003/0031180 A1 Feb. 13, 2003

Related U.S. Application Data

(63) Continuation-in-part of application No. 09/751,590, filed on Dec. 29, 2000, now Pat. No. 6,493,341, which is a continuation-in-part of application No. 09/476,646, filed on Dec. 31, 1999, now Pat. No. 6,295,276.

(60) Provisional application No. 60/174,114, filed on Dec. 31, 1999.

(51) Int. Cl.
*H04L 12/56* (2006.01)

(52) U.S. Cl. ...................... 370/254; 370/401

(58) Field of Classification Search ............... 370/254, 370/255, 401, 402
See application file for complete search history.

(56) References Cited

U.S. PATENT DOCUMENTS 6,665,702 B1 * 12/2003 Zisapel et al. ............... 718/105

OTHER PUBLICATIONS

Radware Press Release, 'Radware announces LinkProof: The first IP Load Balancing Solution for networks with multiple ISP connection', Oct. 7, 1999.*
David Greenfield, 'Global Product Spotlight: Radware Linkproof', NetworkMagazine.com, Dec. 1, 1999.*
Peter Christy, 'Radware Balances the Network', Internet Traffic Management Center, Jan. 1, 2000.*
Veronique Saunier, Radware Seeks Solutions to Easy-Access Problems, South China Morning Post, Dec. 7, 1999.*

* cited by examiner

*Primary Examiner*—Melvin Marcelo
(74) *Attorney, Agent, or Firm*—Ogilvie Law Firm

(57) ABSTRACT

A controller is provided for increasing bandwidth between a local area network ("LAN") and other networks by using multiple routers on the given LAN. Data packets are multiplexed between the routers using a novel variation on the standard SYN packet synchronization protocol, and other components. On receiving data destined for an external network, the controller or gateway computer will direct the data to the appropriate router. In addition to providing higher speed connections, the invention provides better fault tolerance in the form of redundant connections from the originating LAN to a wide area network such as the Internet.

10 Claims, 3 Drawing Sheets

COMBINING ROUTERS TO INCREASE CONCURRENCY AND REDUNDANCY IN EXTERNAL NETWORK ACCESS

RELATED APPLICATIONS

This application claims priority to, and is a continuation-in-part of, application Ser. No. 09/751,590 filed Dec. 29, 2000, which is a continuation-in-part of Ser. No. 09/476,646 filed Dec. 31, 1999, now U.S. Pat. No. 6,295,276, which claims the benefit of Ser. No. 60/174,114 filed Dec. 31, 1999. Each of these applications is incorporated herein by reference.

FIELD OF THE INVENTION

The present invention relates to computer network data transmission, and more particularly relates to the cost-efficient use of multiple routers to provide connections with wide area networks, including connections with the global computer network commonly referred to as the Internet.

TECHNICAL BACKGROUND OF THE INVENTION

Many local area networks ("LANs") are connected to the Internet or another wide area network ("WAN"). LANs may also be connected to one another through the Internet or another WAN. A given LAN, or a given sub-network of a LAN, is connected to the WAN through a device known as a router. For convenience, reference is made hereafter to LANs with the understanding that "LAN" means "LAN or sub-network" unless otherwise stated. Routers use both WAN addresses, such as Internet Protocol ("IP") addresses, and physical addresses, such as Ethernet addresses. Physical addresses may also be called "data link addresses".

Each router receives from its LAN all network traffic addressed to a destination outside the LAN, such as data packets addressed to a remote IP address. The router forwards those packets to the next router along a path to the destination. The path often takes the packet through part of the Internet or another WAN. The router likewise receives Internet or other WAN packets from other LANs which are destined for machines within the router's LAN, and re-directs the packets so they can be delivered using physical addresses which are internal to the LAN. Conversion from an IP address to a data link address such as an Ethernet address may be done using a conventional Address Resolution Protocol ("ARP"). Some known systems use two or more routers with a form of inflexible load balancing, whereby all requests go out over a first router and all responses come back over a second router.

FIG. 1 illustrates a conventional network topology 100 which uses a router to connect a LAN (or sub-network, as noted above) to a WAN. Several nodes 102 are connected by LAN "wires" in a LAN 106. The nodes 102 may include machines such as desktop computers, laptops, workstations, disconnectable mobile computers, mainframes, information appliances, personal digital assistants, and other handheld and/or embedded processing systems. The "wires" 104 may include twisted pair, coaxial, or optical fiber cables, telephone lines, satellites, microwave relays, modulated AC power lines, and/or other data transmission "wires" known to those of skill in the art. The network 106 may include UNIX, TCP/IP based servers; Novell Netware®, VINES, Microsoft Windows NT or Windows 2000, LAN Manager, or LANtastic network operating system software (NET-WARE is a registered trademark of Novell, Inc.; VINES is a trademark of Banyan Systems; WINDOWS NT, WINDOWS 2000, and LAN MANAGER are trademarks of Microsoft Corporation; LANTASTIC is a trademark of Artisoft).

Another "wire" 108 connects a router 110 to the LAN 106. A wide variety of routers 10 are known in the art. At a minimum, the router 110 maintains a table of routes for different destination addresses. Different routers 110 can handle different physical address types (Ethernet, . . . ). Some routers provide firewall services. Different routers also handle connections that run at different speeds using different line technologies (T1, T3, ADSL, RADSL, . . . ). But in general, some type of high-speed connection 112 connects the router 110 to a WAN 114.

The Internet or a portion of the Internet may serve as the WAN 1114, or the WAN 114 may be separate from the Internet. "Internet" as used herein includes variations such as a private Internet, a secure Internet, a value-added network, a virtual private network, or a wide area intranet. Another connection 116 connects a server 118 or other destination with the WAN 114.

Like the illustrated topology 100, other conventional network topologies utilize one router per LAN (or sub-network). Conventional network topologies do not support the routing of data over multiple routers in any given LAN. For instance, standard TCP/IP stacks are not able to direct data packets from a given LAN to multiple routers when the data needs to be sent to another LAN. Multiple routers may be physically present, but one router is designated as the default gateway for the LAN. This default gateway receives all the traffic for the LAN from outside, and forwards data packets from inside the LAN to the next LAN on their way to their destinations.

The router 110 which serves as the default gateway also maintains a table of routes for different destination addresses. Data transmission generally takes place between two networks over the shortest defined path, where a path is represented as a list of routers which the data has to traverse in order to reach the destination node. For instance, a data packet from a given node 102 addressed with the IP address of the server 118 will be sent from the node 102 over the LAN wires 104, 108 to the gateway router 110, will travel from there over the high-speed connection 112 to the WAN 114 (which may forward the packet along a path containing multiple routers), and will finally arrive at the server 118.

Once a node such as a client PC 102 on the LAN 106 performs the Address Resolution Protocol, the information is stored in an ARP table on the client PC 102. After this the PC 102 does not send an ARP request until a timeout condition occurs. ARP tables and ARP timeouts are used in conventional systems and they may also be used according to the invention. After an ARP request is sent because of a timeout, or for another reason (e.g., when an ARP table entry is made manually), IP communication starts with a SYN packet. SYN packets in and of themselves are known in the art.

Similar steps occur when a packet from the same node 102 is addressed to another node on a distant LAN. In place of the server 118 the path would include another router connected to the distant LAN. In its capacity as gateway for the distant LAN, the distant router would receive the packet from the WAN 114 and deliver it to the distant node.

For clarity of illustration, Internet Service Providers ("ISPs") have not been shown in FIG. 1. However, those of skill in the art understand that one or more ISPs will often be located along the path followed by a packet which travels to or from a LAN node 102 over the Internet 114.

The configuration 100 is widely used but nevertheless has significant limitations. Although the data transmission speed over lines such as the line 112 is relatively high when compared to traditional analog telephone data lines, the available bandwidth may not always be sufficient. For instance, the number of users within the LAN 106 may increase to a point at which the data transmission capacity of the WAN connection 112 reaches its maximum limit. In order to obtain more bandwidth, a company could lease more expensive dedicated data lines 112 which have greater data transmission speeds, such as lines employing T3 or OC3 technologies.

To delay expensive upgrades to line technology and to the corresponding router technology, bandwidth can be used more efficiently. This might be done by compressing data, by combining different types of data to reduce the total number of packets, and by reducing unnecessary access to the WAN 114 through appropriate personnel policies. Tools and techniques for improving router 10 performance are also being developed and made commercially available. In addition, new data transmission technologies like ADSL, RADSL, and others are being proposed and developed. Although these technologies do not have as high a data transmission rate as T3 or OC3, they are several times faster than analog lines.

Moreover, U.S. Pat. No. 6,253,247 describes a mux device for assisting the transmission of a user's data between two computer networks. The mux device could be added to a system like that shown in FIG. 1 to increase the bandwidth of the connection 112 by using multiple modem connections. The mux device allocates exclusively to a user for a period of time at least two connections between the two computer networks. Each of the connections uses a telephone connection which is physically separate from the other connection(s) for at least a portion of that connection. The mux device also contains other components, and the application also describes and claims methods and systems.

U.S. Pat. No. 6,295,276 describes an invention which is related to the present invention. The invention of the '278 patent involves ARP (address resolution protocol) tools and techniques, while the present invention involves SYN (synchronization) tools and techniques.

However, taking the conventional measures noted above may still provide only a short-term solution. Despite such measures, demands on the line 112 can still quickly grow to exceed the bandwidth of the line 112, thereby forcing the LAN 106 owner to seriously consider an expensive upgrade in line 112 and router 110 technology, such as an upgrade from a T1 connection 112 to a T3 connection 112.

Accordingly, it would be an advancement in the art to provide another alternative for increasing the bandwidth available to connect a LAN with a WAN, without requiring a routing system upgrade to a substantially more expensive line technology. This can also enhance the reliability of the network by adding a redundant connection for network communication outage avoidance.

It would also be an advancement to provide such an alternative which is compatible with a wide variety of existing line technologies and routers.

Such improvements to LAN-WAN connectivity are disclosed and claimed herein.

BRIEF SUMMARY OF THE INVENTION

The present invention provides a system and method for improved data transmission in the form of high-speed interconnections over wide area networks such as the Internet. The novel interconnections use multiple routers to provide multiple links between two or more sites, providing greater bandwidth by combining or teaming the individual routers and connections. For instance, data may be exchanged between a local area network and a target server or a target remote LAN using multiple routers. Several relatively low-cost routers and lines can be combined to give a much greater aggregate data throughput, thereby avoiding at least for a time the need to upgrade to a more expensive line technology, such as an upgrade from T1 to T3 line technology.

Traditional networking concepts involve a network configuration with one router per LAN (as elsewhere herein, "LAN" means "LAN or sub-network" unless stated otherwise; a LAN may include an intranet). As noted above, the traditional network design cannot support data routing over multiple routers in a LAN. Instead, traditional designs require that users designate one router as the default gateway.

By contrast, in the novel configuration each LAN is allowed to have multiple routers communicating with other LANs. Controller software may be installed on a computing device containing a microprocessor and peripherals. This computer, known as the gateway computer, can be designated as the default gateway for a LAN. On receiving data destined for an external network, the controller software will direct the data to the appropriate router for the LAN. In addition to providing higher speed connections, the present invention thus provides redundant connections from the originating LAN to the wide area network, thereby increasing the system's fault tolerance. When a router stops functioning, the controller software automatically redirects the data destined for the external network to one or more other functioning routers.

The controller software decides, based on router loads and/or other criteria, when to add in the next router. This provides each LAN with higher speed access to the external network, since the total speed attained will be closer to the sum of the speeds achieved by each router. The invention will direct traffic to different routers, whereas a conventional gateway PC is only aware the existence of one router. The controller will work with all existing router technologies like ANALOG, ISDN, ADSL, T1, DS3, frame relay, and so on, as well as future technologies like cable modem and other data technologies for routing data packets. The invention does not require multi-link PPP (Point-to-Point Protocol) or an inverse multiplexing device at an Internet service provider.

In one embodiment, a LAN/intranet device sends out a request to access some resource on the Internet, such as a Web page. The request is directed to the controller on the LAN. The controller senses how many routers are connected to it, selects one, and routes the request to the selected router. The request reaches the destination resource and the destination generates a response. The response from the Internet comes back to the router, which sends it back to the controller computer, which in turn sends it to the user on the LAN.

On a LAN with multiple client devices, one device or multiple devices may send out many data or resource requests at the same time. The controller computer receives all these requests and distributes them intelligently among multiple routers, keeping track of the load on each router. In this way, the responses to these requests also come back through multiple routers. These routers are working concurrently, so the total bandwidth available to the LAN/intranet users is approximately the combined bandwidth of the multiple routers.

In another embodiment, two or more LANs communicate with each other using multiple routers. The data stream is multiplexed over several routers going out of the first LAN, and then at the receiving LAN the data stream is recombined to restore the sequence of the original data transfer. This method provides combined throughput higher than single data line throughput. The controller software on the two communicating data networks is made aware of the addresses of the multiple routers on the two ends of the communication path, by exchanging command data packets at the beginning of data transfer and periodically thereafter.

In each embodiment, when the novel controller software receives a SYN packet it is an indication that a new data transfer connection has been requested. This also indicates to the novel controller software that a new data stream is ready for multiplexing or directing to the router(s). The controller selects a router, based on information such as router loads and/or router usage history, and modifies the SYN packet such that the selected router will then be used by the new connection.

In summary, the present invention provides tools and techniques to allow more than one router per LAN for external data traffic, including multiple traffic packets which are directed to the same destination such as a Web page. The invention provides tools and techniques for managing the bandwidth of the multiple routers on a LAN, including tools and techniques for combining multiple routers' bandwidths with a single-ended approach that allows but does not require any reciprocating technology at the opposite end. The invention provides tools and techniques for redirecting traffic to several routers from one controller computing device. Communication between two physically separate data networks may take place using multiple routers, so that multiple data links are simultaneously used as separate data streams. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, and configured storage media for combining routers to provide increased concurrency for external access by a computer network. In particular, the invention makes novel use of SYN (synchronization) packets and related protocols, and uses other tools and techniques to multiplex routers which connect local area networks ("LANs") to wide area networks ("WANs") such as the Internet. This allows the owner or administrator of a LAN to aggregate the speeds of relatively low cost routers and WAN access lines. Aggregating low cost routers allows the LAN owner or administrator to avoid upgrading the routing system to the next higher level of technology, which would substantially increase the cost of access.

The invention manipulates the path of packets to multiplex them between multiple routers. No change is needed to packets, except in cases where the source address is modified to replace the client PC address by a novel controller address. If a public IP address is being used, this replacement is not necessary. If a private IP address is used, it may be changed to enhance security but this is not necessarily required for multiplexing. Various components of the invention and its environment are discussed below.

Network Topology & Nodes

Figure 1:
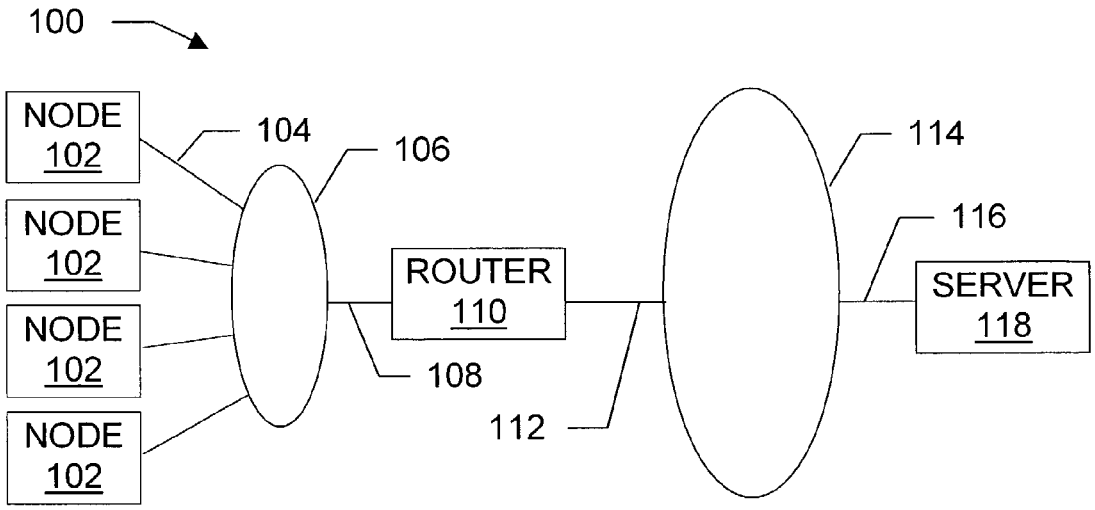
FIG. 1 is a diagram illustrating a conventional network topology, including a router which connects a local area network to a wide area network.
Figure 2:
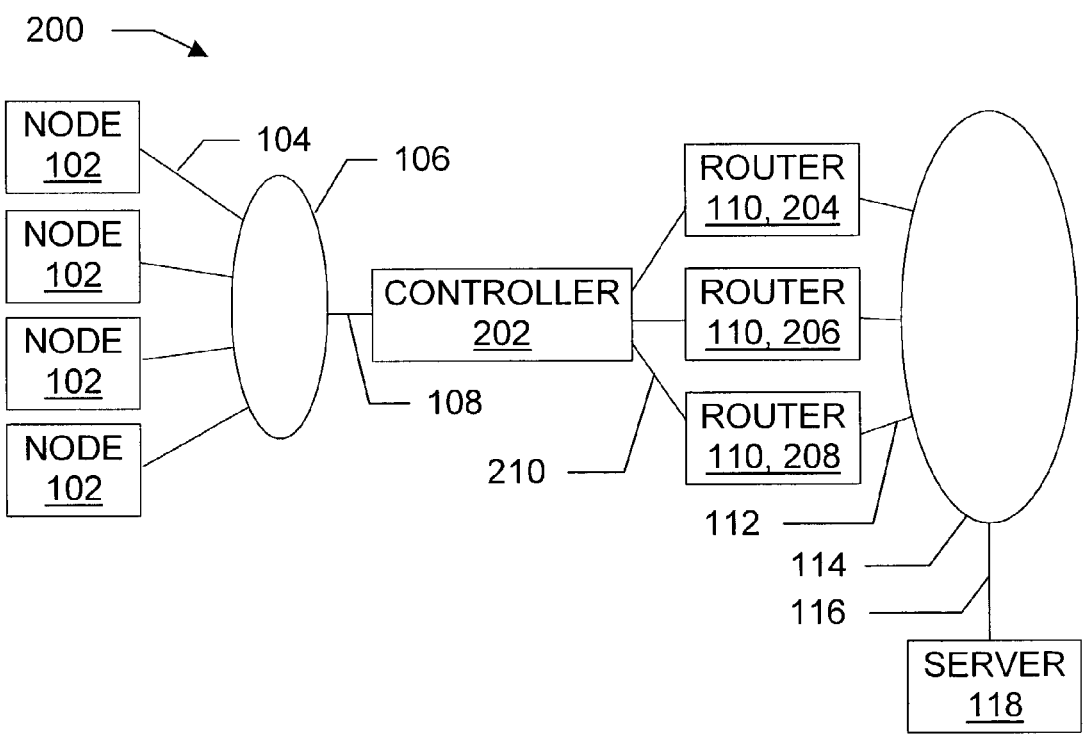
FIG. 2 is a diagram illustrating a network topology according to the present invention, including a controller and several routers which together connect a local area network to a wide area network.

FIG. 2 illustrates a novel network topology or configuration 200 according to the invention. As with the conventional topology 100 shown in FIG. 1, one or more nodes 102 are connected by "wires" 104 in a LAN 106. As with the conventional topology 100, a connection of some type is desired between the LAN 106 (or sub-network 106) and a WAN 114 such as the Internet, in order to allow communication over the WAN 114 between the nodes 102 on the one hand, and a target such as the server 118 or a remote LAN (not shown), or some other target, on the other hand.

Unlike the conventional configuration 100, the novel topology 200 includes a controller 202 which multiplexes data packets between several routers 110. Although the controller 202 is not necessarily a router 110 per se, a computer running the controller 202 may be designated as the default gateway for the LAN 106. The controller can be a part of a router with multiple interfaces for multiple WAN connections. Advantageously, the invention does not require any change to the network operating system, TCP/IP stacks, or packet formats used by the LAN 106. Nor does the invention require modifications to conventional routers 110 or WANs 114. Instead, the invention inserts the controller 202 into the LAN 106 and modifies the operation of the LAN 106 in a way that multiplexes data packets over two or more routers 110, thereby providing additional bandwidth to the LAN-WAN connection.

In the illustration, the controller 202 multiplexes data between three routers 204, 206, and 208, to which the controller 202 is connected by a "wire" of the type discussed above. In alternative embodiments, the controller 202 can multiplex two, three, four, or more routers 110, depending on the embodiment. In some embodiments, the number of routers 110 varies dynamically. In some embodiments, the controller 202 resides on the same computer as one of the routers 110, so the wire 210 may include a bus and/or shared memory.

The controller 202 may be implemented as software containing executable instructions and data, or it may consist of hardware and software. In the latter case, the hardware may be general-purpose (e.g., a server or client running Windows, Linux, or the like) or special purpose (e.g., a router or bridge). But in either case the hardware includes at least one processor and memory accessible to the processor, and the software contains executable instructions and data which are stored in the memory and which guide operation of the processor to perform router identification, router selection, and SYN packet handling as described herein.

Figure 3:
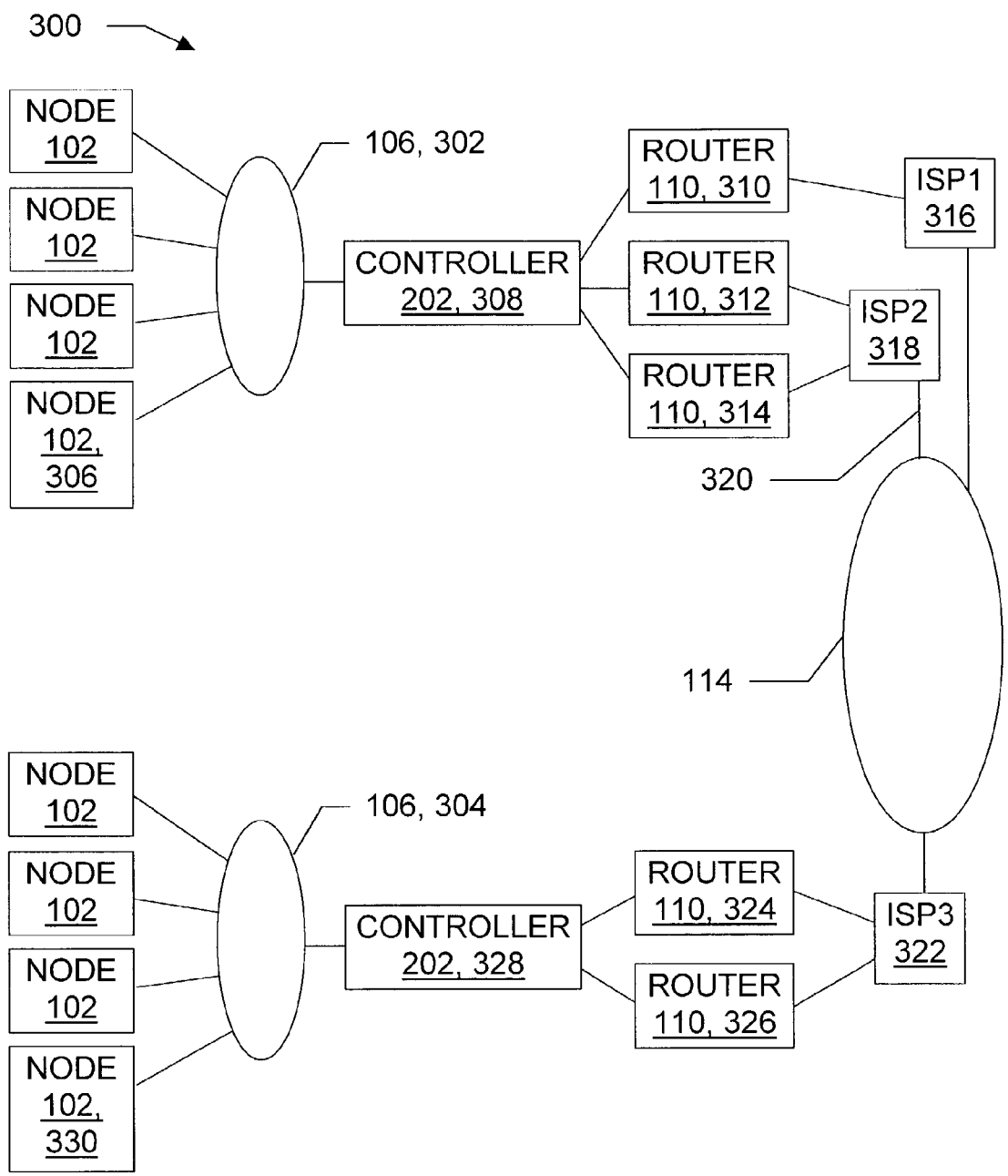
FIG. 3 is a diagram illustrating another network topology according to the present invention, including two local area networks, each of which is connected through its own controller and multiple routers to its own Internet service provider(s) and hence to the Internet.

FIG. 3 illustrates an alternative novel topology 300. Two LANs (or sub-networks) 302, 304 are connected to the WAN through two controllers, with each controller designated as the default gateway for its respective LAN. Internet Service Providers ("ISPs") are also shown explicitly in FIG. 3; if the role of the WAN 114 in FIG. 1 or 2 is played by the Internet, then ISPs may also be present in those topologies, even though they are not shown expressly. Moreover, ISPs need not be present when two LANs 106 are connected through a WAN 114 according to the invention.

For convenience, the computers on the LANs in the Figures are referred to simply as nodes 102. However, a given node 102 may function as a LAN server or as a LAN client in a client/server LAN. A node 102 may also function both as a client and as a server; this may occur, for instance, in peer-to-peer networks or on computers running Microsoft Windows NT or Windows 2000 software. The nodes 102 may be uniprocessor and/or multiprocessor machines, and may be permanently connected to the LAN 106 or merely connectable (as with mobile computing devices 106 such as laptops).

The nodes 102 each include an addressable storage medium such as random access memory and/or a nonvolatile storage medium such as a magnetic or optical disk. Signals according to the invention may be embodied in the "wires" 106, 108, 112, and/or 116; signals may also be embodied in the volatile and/or nonvolatile addressable storage media. In the claims, an embodied signal necessarily includes the equipment embodying the signal. In addition to the nodes 102, the network 106 may include other equipment such as printers, plotters, and/or disk arrays. Although particular individual and network computer systems and components are shown, those of skill in the art will appreciate that the present invention also works with a variety of other networks and computers.

One or more of the nodes 102 or other computers discussed herein (e.g., a controller 202, routers 110, server 118, WAN 114 computers) may be capable of using floppy drives, tape drives, optical drives or other means to read a configured storage medium. A suitable storage medium includes a magnetic, optical, or other computer-readable storage device having a specific physical substrate configuration. Suitable storage devices include floppy disks, hard disks, tape, CD-ROMs, PROMs, RAM, flash memory, and other computer system storage devices. The substrate configuration represents data and instructions which cause the computer system to operate in a specific and predefined manner as described herein. Thus, the medium tangibly embodies a program, functions, and/or instructions that are executable by the computers discussed herein to perform router multiplexing steps of the present invention substantially as described herein.

An Example With Two LANs

To better understand the components and operation of the invention, an example using the topology 300 shown in FIG. 3 is now discussed. Aspects of the invention in other topologies are similar.

Assume that a data packet is being sent by a first node 306 on the first LAN 302 to a second node 330 on the second LAN 304. The data packet has a physical address and an IP address corresponding to the source node 306 and also has an IP address corresponding to the destination node 330. The node network interface checks the destination IP address, sees that the destination IP address does not belong to the local LAN 302, and asks on the network 302 for the physical address of the gateway which has the job of forwarding packets toward the destination IP address. The gateway may be part of a node 102 which also runs software implementing the controller 308, or the gateway may be an entirely conventional gateway program or device when the controller 202 runs on another node 102 or on a router 110.

When the node asks on the network 302 for the physical address of the gateway which has the job of forwarding packets toward the destination IP address, it does so by making an address resolution protocol ("ARP") request. ARP is a well-known protocol defined in RFC 826 which maps IP addresses onto data link layer addresses such as Ethernet addresses. Once a client PC 102 on the LAN 302 performs ARP, the information is stored in an ARP table on the client PC. After this the PC does not send an ARP request till timeout. Once this happens, as well as independently (e.g., when an ARP table entry is made manually), IP communication starts with a SYN packet.

When the novel controller 308 receives a SYN packet it is an indication that a new data transfer connection has been requested. This also indicates to the controller 308 that a new data stream is ready for mutiplexing or directing to a router 110. The information flow in the system 300 then proceeds according to FIG. 5, as discussed below.

The controller 308 will trap the SYN request packet. Based on a load balancing algorithm, a round-robin approach, or another selection mechanism, the controller 308 will select a router 110 from a group of routers 110. The selection is done in a manner which increases concurrent operation of the routers 110 and thereby helps provide the LAN 302 with improved access to the WAN 114 through the several routers. In the illustrated topology 300, the controller 308 may select from three routers 310, 312, and 314, but in alternative embodiments the selection may be made from two or more routers 110. The controller 308 then modifies the SYN packet by replacing the source physical address with the physical address of the selected router and the source IP address with the IP address of the controller 308.

As a result of the modification to the SYN packet, the data packet is sent to the selected router 110 for forwarding. For instance, if the router 312 was selected by the controller 308, then the data packet would be sent to that router 312. From there the data packet travels to an ISP, onto the WAN 114, and then to a destination ISP 322. As noted earlier, the destination need not be an ISP, but could also be a server or another computer which is part of the WAN 114 or which is connected to the WAN 114.

A destination ISP may also be connected to a LAN 106 which does not contain a controller 202 but instead uses a conventional routing system. That is, despite the fact that FIG. 3 shows both the sending and receiving LANs configured with novel controllers 202, some alternative embodiments have a controller 202 only at the source and others use a controller 202 only at the destination.

Returning to the topology shown in FIG. 3, ISP router 322 is connected to two destination routers 324, 326. The ISP router 322 may multiplex these two routers by sending the packet to whichever of the routers 324, 326 was specified in a path supplied by the source router 312. At the receiving LAN 304, the data stream is recombined in an orderly manner. That is, the sequence of the original data transfer from the source 302 is restored, either by the controller 328 or by destination networking software which relies on conventional data packet numbers created by the source networking software.

To provide the source controller 308 with the addresses of the destination routers 324, 326, at the beginning of data transmission and periodically thereafter the controller software 308 at the source 302 may exchange command data packets with the controller software 328 at the destination 304. That is, an inquiry can be sent from the source 302 to the destination 304 asking for the IP and/or physical addresses of destination routers, and those addresses can be provided to the source controller in a response from the destination controller. One set of packets requests the addresses of the distant LAN's router(s), while the response packets provide the addresses. The sending LAN 106 can provide the addresses of its own router(s) 110 in its request for the other LAN's router addresses. Additional information such as the state of the routers, state of the WAN lines, etc. can also be exchanged.

Alternatively, incoming packets need not be multiplexed. For instance, the ISP router 322 may simply use whichever destination router (324 or 326) was identified to the ISP router 322 as the default gateway when the destination LAN 304 first made its connection to the ISP.

Controller

Figure 4:
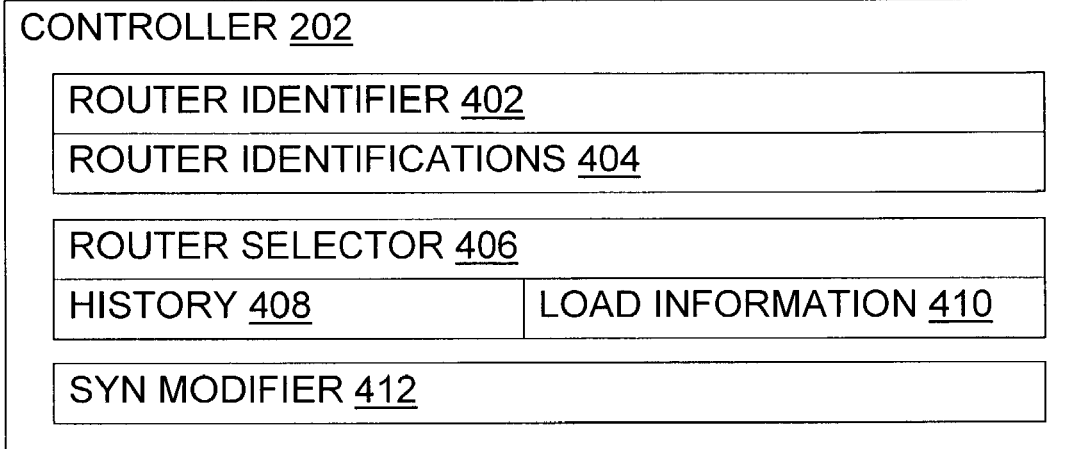
FIG. 4 is a diagram further illustrating the novel controllers shown in FIGS. 2 and 3.

The controller 202 is illustrated further in FIG. 4. The controller 202 includes a router identifier 402 for identifying, in a set of router identifications 404, at least two routers 110 which are connected to the WAN 114. The computer (router 110 or personal computer running controller 202 software) which is serving as the default gateway from the point of view of packet-generating nodes 102 may also be among the identified routers. Routers 110 may be made known to the router identifier 402 manually by a network administrator, or the router identifier 402 may send out probe packets of the type used when mapping a network topology. U.S. Pat. No. 5,781,534 describes one suitable topology probe packet implementation; other tools and techniques for learning the address and location of one or more routers 110 are also familiar to those of skill in the art.

Each identified router 110 has its own IP address and its own physical address. These addresses are stored in computer memory in a list, table, or other data structure of router identifications 404. The router identifications 404 include an active list of mapped port numbers and the address of the router 110 on which the connection to the port was created. The router 110 address may be a physical address or an IP address, or both types of addresses may be included. The active list of mapped port numbers is maintained by the controller 202. One of the many suitable implementations of the invention comprises the following code:

```
/* This is data structure for a table that contains an entry for each
   connection (Term connection has loose meaning here and it is applied
   to ICMP, UDP and other connectionless protocols, as well as to TCP).
   Information in this structure is needed to properly route and
   masquerade packets.
*/
```

```c
struct tcp_conn {
        struct list_head m_list, s_list, d_list;

u32 saddr;
        u32 maddr;
        u32 daddr;
        u16 sport;
        u16 mport;
        u16 dport;

u16 proto;

struct timer_list timer;
        unsigned flags;

atomic_t refcnt;

struct ethdev* dev;
        u_long tcp_expires;      /* delete entries older than this */ unsigned state;          /* state of TCP connection */
        enum TCP_TYPE type;

/* FTP portion */
        long seq_diff;           /* seq and ack number adjustment */
        long prev_seq_diff;      /* seq and ack number adjustment */
        u32 last_port_seq;       /* seq number of last PORT cmd */ u32 fwmark;

// function pointer that is called for incoming traffic
        int (*in_func)(struct sk_buff **pskb,struct tcp_conn *tcp_tab);

// function pointer that is called for outcoming traffic
        int (*out_func)(struct sk_buff **pskb,struct tcp_conn *tcp_tab);
};

/* This is part of output routing function which first checks whether a
   connection to which this packet belongs is already in the routing
   table, or not. If yes, the table entry contains all information
   needed for routing and masquerading. If not, a new device for this
   connection is chosen based on currently selected load balancing
   algorithm and route availability.
*/
        tcp_tab = tcp_out_get(iph->protocol,
                                    iph->saddr,sport,
                                    iph->daddr,dport);

if( tcp_tab )
                field_check_output(pskb,tcp_tab);
        else {
                if( !(tcp_tab = out_new_entry(pskb)) )
                        goto exit;
        } if( tcp_tab->out_func )
                tcp_tab->out_func(pskb,tcp_tab);
        else
                goto exit;
```

```
#define PMSIZE 400/*256*/
#define ICMPSIZE 100
#define PMTTL   120/*60*/
#define ICMPTTL  20
#define MILLISECOND_DELAY 11000/*6000*/
typedef unsigned long IPaddr;
typedef unsigned char  u_char;
#define FALSE      0             /* Boolean constants        */
#define TRUE       1
#define EMPTY      (-1)          /* an illegal gpq           */
#define SYSCALL    int _export   /* int system call declaration */
#define PSYSCALL   void * _export /* ptr system call declaration */
#define PROCESS    int _export   /* Process declaration      */
#define THREAD     int _export   /* Thread  declaration      */
#define COMMAND    int _export   /* Shell command declaration */
#define LOCAL      static        /* Local procedure declaration */
#define BUILTIN    int           /* Shell builtin ""         */
#define WORD       word          /* 16-bit word              */
#define MININT     0x8000        /* minimum integer (16-bit) */
#define MAXINT     0x7fff        /* maximum integer (16-bit) */
#define MINSTK     0x800         /* minimum process stack size */
#define OK         1             /* returned when system call ok */
#define SYSERR     -1            /* returned when sys. call fails*/
#define INITPRIO   0             /* initial process priority */
/*
 *   Delta seq. info structure
 *   Each MASQ struct has 2 (output AND input seq. changes).
 */
struct ip_masq_seq {
        ULONG/*__u32*/         init_seq;   /* Add delta from this seq */
           ULONG         init_seq_out;
        short            delta;        /* Delta in sequence numbers
*/
        short            previous_delta;  /* Delta in sequence numbers
before last resized pkt */
};
struct pmap {
    IPaddr  ips;       /* IP source address */
    char    proto;     /* packet type */
    int     sp;        /* source port */
    int     nsp;       /* NEW source port */
    int     ttl;       /* time to live */
    struct  ip_masq_seq out_seq, in_seq;
};
struct icmpmap {
    IPaddr  ips;       /* IP source address */
    IPaddr  ipd;       /* IP source address */
    char    proto;     /* packet type */
    int     ttl;       /* time to live */
};
struct user{
    IPaddr  ips;       /* IP source address */
    int     ttl;       /* time to live */
};
//extern struct pmap pmtab[];
//extern int pm_up;
//extern int pm_active;
struct pmap pmtab[];
struct user userTab[5];
```

```
//NDIS_TIMER Timer;
#define FTP_PORT   21
#define PROTOCOL_ICMP 1
typedef struct pmap PMAP, *PPMAP;
extern  unsigned short  cksum();     /* 1s comp of 16-bit 1s comp sum*/
#define hs2net(x) (unsigned) ((((x)>>8) &0xff) | (((x) & 0xff)<<8))
#define      net2hs(x) hs2net(x)
#define hl2net(x) (((((x)& 0xff)<<24) | ((x)>>24) & 0xff) | \
       (((x) & 0xff0000)>>8) | (((x) & 0xff00)<<8))
#define net2hl(x) hl2net(x)
/* network macros */
#define hi8(x)   (unsigned char)  (((long) (x) >> 16) & 0x00ff)
#define low16(x) (unsigned short) ((long) (x) & 0xffff)
#define BYTE(x, y) ((x)[(y)]&0xff)  /* get byte "y" from ptr "x" */
#define USE_NDIS 1
// The reason to put 3 reserves is Win95 calculates sizeof(...) on 4
// bytes basis. Good for future features expansion too.
typedef struct _ACBLOCK
{
       char   szIPAddress[20];
       char   szUser[20];
       ULONG  IPAddress;
       BOOLEAN    FtpEnable;
       BOOLEAN    EmailEnable;
       BOOLEAN    NewsEnable;
       BOOLEAN    WebEnable;
       BOOLEAN ChatEnable;
       BOOLEAN Reserved1;
       BOOLEAN Reserved2;
       BOOLEAN Reserved3;
} ACBLOCK, *PACBLOCK;
#define MAX_FATPIPE_USERS 50
ACBLOCK ACBlock[ MAX_FATPIPE_USERS ];
#define SIZEOF_ACBLOCK sizeof(ACBLOCK)
// Define control codes
#define DIOC_BYTES 20
#define DIOC_SET_ACBLOCK 21
#define DIOC_SET_USERS 22
#define DIOC_READ_LINKSPEED 23
#define DIOC_DIALER_STARTED 24
#define DIOC_DIALER_ENDED 25
#define DIOC_READ_DNS_NUM 26
#define DIOC_READ_DNS_ENTRY 27
#define DIOC_SET_DNS_ADDRESS 28
#define DIOC_READ_DIAL 29
#define HOOKCSVC_Major       1
#define HOOKCSVC_Minor       0
#define HOOKCSVC_DeviceID    UNDEFINED_DEVICE_ID
#define HOOKCSVC_Init_Order VMM_INIT_ORDER + 1
//#define HOOKCSVC_Init_Order UNDEFINED_INIT_ORDER
// Adding init order
//#define HOOKCSVC_Init_Order VTD_INIT_ORDER - 1
//#define HOOKCSVC_Init_Order NDIS_Init_Order + 1
// Some RAS in ISP doesn't check the source IP when it does routing
// if IP_SPOOFING is defined, it means this
//#define IP_SPOOFING       1
#define MAX_PORTS_PER_ADAPTER 300 // ? some sites are just taking ports
typedef struct _FATPIPE
{
       UCHAR Enable;
       BOOLEAN NatEnable;
```

```c
} FATPIPE, *PFATPIPE;
FATPIPE Fatpipe;
typedef struct _Adapter
{
        NDIS_HANDLE PPPBindingHandle;
        NDIS_HANDLE PPPBindingContext;
        UCHAR AdapterName[16];
        UINT LineUp;
        ULONG LinkSpeed;
        ULONG IPAddress;
        UCHAR RemoteAddress[6];
        UCHAR LocalAddress[6];
        USHORT PortsMap[ MAX_PORTS_PER_ADAPTER ];
        UCHAR PortsPerAdapter;
        UCHAR AOLAdapter;
        USHORT FtpPortsMap[ MAX_PORTS_PER_ADAPTER ];
        UCHAR FtpPortsPerAdapter;
        USHORT PasvFtpPortsMap[ MAX_PORTS_PER_ADAPTER ];
        UCHAR PasvFtpPortsPerAdapter;
} ADAPTER, *PADAPTER, **PPADAPTER;
#define MAX_FPADAPTER_NUM   4
ADAPTER FPAdapter[MAX_FPADAPTER_NUM];
ADAPTER RsTestAdapter[20];
//int RsTestAdapterIndex = 0;
// for each adapter, the adapter is initialized at least twice
#define MAX_RSWANADAPTER_NUM 6
ADAPTER FPLanAdapter;
ADAPTER RsAOLAdapter;
ADAPTER RsWanAdapter[MAX_RSWANADAPTER_NUM];
PADAPTER RsWanReceiveAdapter;
PADAPTER RsAOLReceiveAdapter;
PADAPTER ReceiveAdapter;
#define ETH_HEADER_LENGTH 14
#define INIT_THRESHOLD   40//10
#define EXTRACT_THRESHOLD 1
#define EXTRACT_THRESHOLD_AOL 1
#define EXTRACT_THRESHOLD_WAN 10
// Protocol fields for Ethernet packets
#define ARP_PROTOCOL     0x0806
#define IP_PROTOCOL          0x0800
ULONG LANIP;
ULONG LANMask;
VOID SetNewDNS(ULONG temp);
typedef int ADAPTER_MODE;
#define RSPPP 0
#define RSAOL 1
#define RSWAN 2
FATPIPE FpControl;
#define NATROUTE
//#define MUX_UDP
#define htons(x) ntohs(x)
#define htonl(x) ntohl(x)
#define ENTRY_NUM 6
#define DNS_LEN 50
#define IP_LEN 20
typedef struct _OneEntry
{
        char DNS[DNS_LEN];
        char IP[IP_LEN];
} OneEntry;
OneEntry Entry[ ENTRY_NUM ];
```

```c
#define ETH_HEADER_LENGTH 14    // Ethernet header length (bytes)
// AdapterNumber -- virtual adapters in the system,
// Assume 4 is maximum for now
#define MAX_ADAPTER_NUMBER 4
// AdapterTable is adapters bound to router being used
// AllAdapterTable is adapters bound to router being used/ not being
used
PADAPTER AdapterTable[ MAX_ADAPTER_NUMBER ];
PADAPTER AllAdapterTable[ MAX_ADAPTER_NUMBER ];
//UCHAR AdaptersUsing = 0;
//UCHAR AllAdaptersUsing = 0;
//int g_IPCount = 0;
//ULONG g_TxRate = 0;
//ULONG g_RxRate = 0;
PADAPTER ReceiveAdapter;
PADAPTER LanAdapter;
NDIS_HANDLE  ReceiveAdapterContext;
PNDIS_BUFFER BigNdisBuffer;
/*STATIC*/ NDIS_STATUS RegGetAdapterInfo( IN PNDIS_STRING IMParamsKey,
IN PADAPTER Adapter );
VOID FpRegisterAdapter( IN PADAPTER Adapter );
VOID RegReadFpControl( IN PUNICODE_STRING RegistryPath );
ULONG ntohl( IN   ULONG NetworkIPAddress );
USHORT ntohs( IN USHORT  NetworkWord );
// Protocol field in the IP header
#define PROTOCOL_TCP    6
#define PROTOCOL_ICMP   1
#define PROTOCOL_UDP    17
#define PROTOCOL_IGMP   2
#define ETH_IP_PROTOCOL 0x0800
#define FTP_PORT        21
#define SMTP_PORT       25
#define NNTP_PORT       119
#define HTTP_PORT       80
#define POP3_PORT       110
#define CHAT_PORT       194
#define DOMAIN_PORT     53
#define AUTH_PORT       113
#define DHCPSERV_PORT   67
#define UDP_HEADER_LENGTH 8
#define DIABLO_PORT     6112
```

More generally, the controller 202 and its components may each be implemented on one or more of the nodes 102 and/or routers 110. Implementation may be done by using the teachings presented here with programming languages and tools such as Java, Pascal, C++, C, Perl, shell scripts, assembly, firmware, microcode, logic arrays, PALs, ASICS, PROMS, and/or other languages, circuits, or tools as deemed appropriate by those of skill in the art. No claim is made to conventional computers or routers, but those conventional devices may be supplemented with controller 202 software or special-purpose hardware and thereby become novel computers within the scope of the present invention.

The controller 202 also includes a router selector 406 for selecting between routers 110 which have been identified by the router identifier 402. The router selector 406 makes its selection in a manner which increases concurrent operation of identified routers 110 and thereby helps provide improved access between the LAN 106 and the WAN 114 through identified routers 110. This may be done in various ways, with different embodiments of the controller 202 employing one or more of the following approaches.

A first approach to router 110 selection uses a simple round-robin method. For instance, in the topology 200, a round-robin controller 202 would modify a first SYN packet to identify the router 204, modify the next SYN packet to identify the router 206, modify the next SYN packet to identify the router 208, modify the fourth SYN packet to start the cycle again by identifying the router 204, and so on, with the selections cycling through the identified routers 204, 206, and 208, as successive SYN packets are handled. A history structure 408 is used to keep track of which router 110 was identified in the last SYN packet, or equivalently, which router 110 should be identified in the next SYN packet. The selection history structure 408 may be implemented as an index or pointer into a table or list of identified routers 110 in the router identifications 404.

A more complex approach to router 110 selection may also be taken by using load information 410 together with a load balancing method implemented in the router selector 406. Load balancing between processors and/or software processes in a distributed computing system in general is well-known, and load sharing between network bridges in particular is known in the art. In the context of the present invention, any suitable load balancing or load sharing algorithm can be used by the router selector 406.

The load information 410 on which the load balancing algorithm operates can be acquired by keeping track of the number and/or frequency of identifications of routers 110 in SYN packets. Inquiry packets may also be sent by the controller 202 to individual routers 110 to obtain information about characteristics such as the number and type of processors used by the router 110, the memory buffer capacity of the router 110, the past and/or current load on the router 110, and whether the router 110 has been so busy or is now so busy that packets were/are being dropped through so-called load shedding.

As indicated above, the controller 202 also includes a SYN modifier 412. The SYN modifier 412 modifies SYN requests that contain the IP address of an identified router 110 or the IP address of the controller, each modified request specifying the physical address of an identified router 110 which was selected by the router selector 406 and the IP address of the controller 202. The SYN modifier 412 operates by trapping SYN requests and subsequent data packets sent to the default gateway, and modifying them to redirect outgoing data traffic to the selected router 110. Tools and techniques for trapping are familiar in the software arts; they include a variety of interception means such as replacement of existing code with code providing different or supplemental functionality, modifications to existing code through patches, redirection through manipulation of interrupt vectors, insertion of stubs and/or renaming objects or routines, and so on.

The actual scope of the controller 202 may vary between embodiments. In some embodiments, only the three components 402, 406, 412 are supplied by a controller 202 vendor. In other cases, the vendor may supply additional components and the extent of the controller 202 increases accordingly.

For instance, in one embodiment the controller 202 includes the components 402, 406, 412 and a computer which is running at least part of the controller 202 as software. In one embodiment, the controller 202 includes the components 402, 406, 412 and at least two identified routers 110 which have been identified by the router identifier 402. In one embodiment, the controller 202 includes the components 402, 406, 412 and at least one network 106 client which generates at least one SYN request which the SYN modifier 412 modifies. In an alternative based on this last approach, the controller 202 and network client 102 is provided and/or configured by the vendor in combination with a computer which is running at least part of the controller 202 as software, with at least two identified routers 110 identified by the router identifier 402, and at least one additional network client 102 which generates at least one SYN request which the SYN modifier 412 modifies.

Note that the invention can be used with all existing router technologies like ANALOG, ISDN, ADSL, TI, frame relay, and so on, with planned technologies like cable modem, and yet-to-be-developed data technologies involving data routing. Also, it is not necessary for an ISP to have multi-link PPP in order to utilize the invention.

Methods

Figure 5:
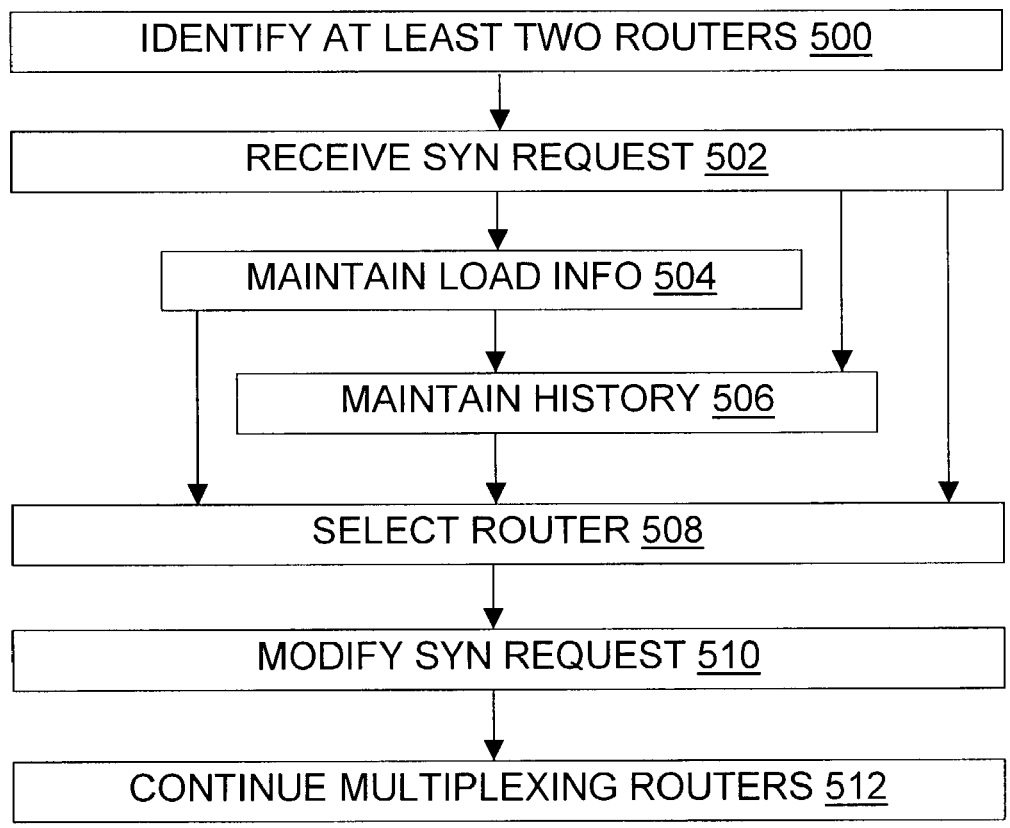
FIG. 5 is a flowchart illustrating several methods of the present invention for combining routers to improve LAN-WAN connectivity.

FIG. 5 illustrates methods of the present invention. During an identifying step 500, at least two routers 110 are identified by the controller 202. This may be done using the router identifier 402 and router identifications 404 as discussed above. The identifying step 500 may be performed at a first location in the LAN 106 to identify an IP address and a physical address for at least two routers 110 elsewhere in the LAN 106. The routers 110 may be special-purpose hardware routers 110, routers 110 implemented with special-purpose software to configure general-purpose hardware, or a combination of such hardware routers 110 and software routers 110.

During a receiving step 502, the default gateway for the network 106 receives a SYN request. The modification to the SYN packet will be determined by the controller 202 during a selecting step 508 and provided during a modifying step 510. In many cases the IP address specified in the request will identify a different machine than the machine ultimately selected by the controller 202 for routing. This may occur in various ways, because the controller 202 may or may not be identified as the default gateway, and may or may not be running on one of the routers 110. Moreover, during step 508 the controller 202 may select between various routers 110, some or all of whose IP addresses are not necessarily known to machines other than the router 110 in question itself and the controller 202.

For instance, the receiving step 502 may receive the SYN request at a machine whose IP address is specified in the request, or the receiving step 502 may receive the SYN request at a machine with a different IP address than the one specified in the SYN packet if that other machine is running controller 202 software. That is, the address of the controller 202 could be specified in the SYN request, or the request could specify the address of a router 110 which is located elsewhere in the network 106. If the controller 202 is on a router 110 and the controller 202 address is specified in the SYN request, then the modified SYN packet sent during step 510 may identify that same router 110 or it may identify another router 110. More generally, when the SYN request specifies the address of one router 110, the controller 202 is generally free during step 508 to select that router 110 or another router 110 and then identify the selected router 110 in the modified SYN request during step 510.

If the machine running the controller 202 is identified to the network 106 as the default gateway, SYN requests essentially specify the controller's physical address. Even if the controller 202 is implemented in software running on a router 110, the router selected by the controller 202 could be the same or another machine. When the controller 202 runs on a separate machine which is not a router 110, the IP address specified in the SYN request will differ from the IP address of whichever router 110 is selected by the controller 202.

The router selecting step 508 may be implemented using the router selector 406 discussed above. The selection may be made in view of historic selection data 408 which is maintained during a step 506 and/or in view of router load information 410 which is maintained during a step 504.

The SYN modifying step 510 may be performed using a SYN modifier 412 to permit the inventive system to multiplex routers and forward data packets accordingly. The format and protocols involved with SYN responses in conventional systems may also be used in a system according to the invention, with the modifications described herein. In particular, the physical address and IP address supplied in a modified SYN request will not necessarily "match" the physical address and IP address specified in the corresponding original SYN request, in the sense that different machines may be specified by addresses in the two requests. The controller 202 and methods of the invention select different routers 110 to increase concurrent operation of the available routers 110 and thereby provide better network access.

During a continued multiplexing step 512 after the novel SYN request is provided during step 510, the controller 202 may continue to multiplex data on a real-time basis. In some embodiments, this is done as follows. When the controller 202 receives IP packets it multiplexes traffic by sending different packets over different routers 110 based on the packet TCP/UDP port number and/or the selection criteria discussed above. The controller 202 maintains an active list of mapped port numbers and the physical address of the router 110 on which the port/connection was created; port numbers and connections match on a one-to-one basis if one looks at a snapshot of the system. The address of a router 110 maintained in the list may include a physical address, an IP address, or both.

The reverse case occurs with traffic origination from the WAN 114. When a client connected to the WAN requests information from a server node 102 within the LAN 106, the novel controller software 202 can redirect the response from the LAN server (e.g., a web server) via the least loaded router. The LAN server includes or communicates with a "router" that is actually the inventive controller 202. This improves the response time for the requested information. Note that there may be multiple responses from the LAN server to a single request, as when a web page references various images that are sent in separate responses.

One of the many suitable implementations of the method comprises the following code:

```
/*
 *      IP masquerading functionality definitions
```

```
*/
#ifndef _IP_MASQ_H
#define _IP_MASQ_H
#include <linux/types.h>
#include <linux/netdevice.h>
#include <linux/skbuff.h>
#include <linux/config.h>
/*
 * This define affects the number of ports that can be handled
 * by each of the protocol helper modules.
 */
#define MAX_MASQ_APP_PORTS 12
/*
 *      Linux ports don't normally get allocated above 32K.
 *      This uses an extra 4K port-space
 */
#define PORT_MASQ_BEGIN 61000
#define PORT_MASQ_END   (PORT_MASQ_BEGIN+4096)
/*
 * Default timeouts for masquerade functions The control channels now
 * expire the same as TCP channels (other than being updated by
 * packets on their associated data channels.
 */
#define MASQUERADE_EXPIRE_TCP       15*60*HZ
#define MASQUERADE_EXPIRE_TCP_FIN   2*60*HZ
#define MASQUERADE_EXPIRE_UDP       5*60*HZ
/*
 * ICMP can no longer be modified on the fly using an ioctl - this
 * define is the only way to change the timeouts
 */
#define MASQUERADE_EXPIRE_ICMP      125*HZ
#define IP_AUTOFW_EXPIRE            15*HZ
#define IP_MASQ_F_OUT_SEQ           0x01  /* must do output seq adjust
*/
#define IP_MASQ_F_IN_SEQ            0x02  /* must do input seq adjust */
#define IP_MASQ_F_NO_DPORT          0x04  /* no dport set yet */
#define IP_MASQ_F_NO_DADDR          0x08  /* no daddr yet */
#define IP_MASQ_F_HASHED            0x10  /* hashed entry */
#define IP_MASQ_F_SAW_RST           0x20  /* tcp rst pkt seen */
#define IP_MASQ_F_SAW_FIN_IN        0x40  /* tcp fin pkt seen incoming
*/
#define IP_MASQ_F_SAW_FIN_OUT       0x80  /* tcp fin pkt seen outgoing
*/
#define IP_MASQ_F_SAW_FIN               (IP_MASQ_F_SAW_FIN_IN | \
                                IP_MASQ_F_SAW_FIN_OUT)
                                /* tcp fin pkts seen */
#define IP_MASQ_F_CONTROL           0x100     /* this is a control
channel */
#define IP_MASQ_F_NO_SPORT                  0x200 /* no sport set yet */
#define IP_MASQ_F_FTP_PASV          0x400 /* ftp PASV command just
issued */
#define IP_MASQ_F_NO_REPLY          0x800     /* no reply yet from
outside */
#define IP_MASQ_F_AFW_PORT          0x1000
#ifdef __KERNEL__
/*
 *      Delta seq. info structure
 *      Each MASQ struct has 2 (output AND input seq. changes).
 */
struct ip_masq_seq {
        ULONG/*__u32*/          init_seq;   /* Add delta from this seq */
```

```
        short           delta;          /* Delta in sequence numbers
*/
        short           previous_delta; /* Delta in sequence numbers
before last resized pkt */
};
/*
 *      MASQ structure allocated for each masqueraded association
 */
struct ip_masq {
        struct ip_masq  *m_link, *s_link; /* hashed link ptrs */
        struct timer_list timer;     /* Expiration timer */
        __u16           protocol;    /* Which protocol are we talking? */
        __u16           sport, dport, mport;    /* src, dst & masq ports */
        __u32           saddr, daddr, maddr;    /* src, dst & masq
addresses */
        struct ip_masq_seq out_seq, in_seq;
        struct ip_masq_app *app;     /* bound ip_masq_app object */
        void            *app_data;   /* Application private data */
        unsigned        flags;       /* status flags */
        struct ip_masq  *control;    /* Corresponding control connection
*/
};
/*
 *      timeout values
 */
struct ip_fw_masq {
        int tcp_timeout;
        int tcp_fin_timeout;
        int udp_timeout;
};
extern struct ip_fw_masq *ip_masq_expire;
/*
 *      [0]: UDP free_ports
 *      [1]: TCP free_ports
 *      [2]: ICMP free ids
 */
extern int ip_masq_free_ports[3];
/*
 *      ip_masq initializer (registers symbols and /proc/net entries)
 */
extern int ip_masq_init(void);
/*
 *      functions called from ip layer
 */
extern int ip_fw_masquerade(struct sk_buff **, struct device *);
extern int ip_fw_masq_icmp(struct sk_buff **, struct device *);
extern int ip_fw_demasquerade(struct sk_buff **, struct device *);
/*
 *      ip_masq obj creation/deletion functions.
 */
extern struct ip_masq *ip_masq_new(struct device *dev, int proto, __u32
saddr, __u16 sport, __u32 daddr, __u16 dport, unsigned flags);
extern void ip_masq_set_expire(struct ip_masq *ms, unsigned long tout);
#ifdef CONFIG_IP_MASQUERADE_IPAUTOFW
extern void ip_autofw_expire(unsigned long data);
#endif
/*
 *
 *      IP_MASQ_APP: IP application masquerading definitions
 *
 */
```

```
struct ip_masq_app
{
        struct ip_masq_app *next;
       char *name;          /* name of application proxy */
        unsigned type;          /* type = proto<<16 | port (host byte
order)*/
        int n_attach;
        int (*masq_init_1)      /* ip_masq initializer */
            (struct ip_masq_app *, struct ip_masq *);
        int (*masq_done_1)      /* ip_masq fin. */
            (struct ip_masq_app *, struct ip_masq *);
        int (*pkt_out)          /* output (masquerading) hook */
            (struct ip_masq_app *, struct ip_masq *, struct sk_buff
**, struct device *);
        int (*pkt_in)           /* input (demasq) hook */
            (struct ip_masq_app *, struct ip_masq *, struct sk_buff
**, struct device *);
};
/*
 *      ip_masq_app initializer
 */
extern int ip_masq_app_init(void);
/*
 *      ip_masq_app object registration functions (port: host byte order)
 */
extern int register_ip_masq_app(struct ip_masq_app *mapp, unsigned short
proto, __u16 port);
extern int unregister_ip_masq_app(struct ip_masq_app *mapp);
/*
 *      get ip_masq_app obj by proto,port(net_byte_order)
 */
extern struct ip_masq_app * ip_masq_app_get(unsigned short proto, __u16
port);
/*
 *      ip_masq TO ip_masq_app (un)binding functions.
 */
extern struct ip_masq_app * ip_masq_bind_app(struct ip_masq *ms);
extern int ip_masq_unbind_app(struct ip_masq *ms);
/*
 *      output and input app. masquerading hooks.
 *
 */
extern int ip_masq_app_pkt_out(struct ip_masq *, struct sk_buff **skb_p,
struct device *dev);
extern int ip_masq_app_pkt_in(struct ip_masq *, struct sk_buff **skb_p,
struct device *dev);
/*
 *      service routine(s).
 */
extern struct ip_masq * ip_masq_out_get_2(int protocol, __u32 s_addr,
__u16 s_port, __u32 d_addr, __u16 d_port);
extern struct ip_masq * ip_masq_in_get_2(int protocol, __u32 s_addr,
__u16 s_port, __u32 d_addr, __u16 d_port);
/*
 *      /proc/net entry
 */
extern int ip_masq_app_getinfo(char *buffer, char **start, off_t offset,
int length, int dummy);

/*
 *      skb_replace function used by "client" modules to replace
```

```
 *      a segment of skb.
 */
extern struct sk_buff * ip_masq_skb_replace(struct sk_buff *skb, int
pri, char *o_buf, int o_len, char *n_buf, int n_len);

#ifdef CONFIG_IP_MASQUERADE_IPAUTOFW
extern struct ip_autofw * ip_autofw_hosts;
#endif /* CONFIG_IP_MASQUERADE_IPAUTOFW */
#endif /* __KERNEL__ */
#endif /* _IP_MASQ_H */
```

In practice, steps of FIG. 5 may be repeated, as when several routers 110 are identified during instances of step 500. Steps may also be omitted, as when step 504 is omitted because a round-robin algorithm is used without reference to measured router 110 loads. Either or both of steps 504, 506 may also be omitted before a particular selecting step 508. Moreover, one may exit the flowchart of FIG. 5 after modifying a SYN request during step 510, without performing an express continued multiplexing step 512. Steps may also be reordered or done concurrently, unless one step requires the result of a previous step. For instance, one might concurrently maintain both load information and a selection history (steps 504, 506), or one might maintain load information while selecting a router (steps 504, 508). Steps may also be grouped differently or renamed. Any or all of these variations may be present regardless of whether they are expressly described or shown as optional here.

SUMMARY

The present invention provides a method for combining routers 110 to provide increased concurrency for external access by a computer network 106. In one embodiment, the method includes the step 500 of identifying at least two routers 10, each identified router 110 having its own IP address and its own physical address; the step 502 of receiving a SYN request; the step 508 of selecting one of the identified routers 10 by determining that consequent use of the selected router 110 will tend to increase concurrent operation of identified routers and thereby help provide improved external access to the computer network 114 through identified routers; and the step 510 of responding to the synchronization request with a modified SYN packet that specifies the physical address and the IP address of the selected router. The invention also provides a computer storage medium having a configuration that represents data and instructions which will cause performance of such method steps for combining routers 110 to provide increased concurrency for external access by a computer network 106.

The selecting step 508 may multiplex packets between identified routers 110 without regard to current router 110 loads. Alternatively, the selecting step 508 may obtain indications of the current loads of identified routers 110 and then choose the selected router by applying at least one load balancing criterion. The receiving step 502 may receive the SYN request at a machine whose IP address is specified in the request even if that machine is not the router selected during step 508. The SYN request may specify the IP address of a first identified router, even if that first identified router is not the router selected during step 508.

The present invention also provides a controller 202 for combining routers 110 to provide increased concurrency in external access to a computer network. In one embodiment, the controller includes the router identifier 402 for identifying at least two routers 110, the router selector 406, and the SYN modifier 412. Each identified router 110 has its own IP address and its own physical address.

The router selector 406 selects between identified routers 110 using load balancing, a round-robin approach, or another algorithm which increases concurrent operation of identified routers 110. This helps provide improved external access to the computer network through at least some of the identified routers.

The SYN modifier 412 provides modified SYN requests that contain the IP address of an identified router 110, with each modified SYN request specifying the physical address of an identified router 110 that was selected by the router selector 406. That is, the SYN modifier 412 substitutes the physical address of the selected router 110 for the physical address that matches the IP address in the original SYN request. In some cases, the physical address supplied by the SYN modifier 412 may match (identify the same machine as) the IP address in the original SYN request, but in general the original request's physical and IP addresses before the SYN trap and the modified physical and IP addresses after the trap will not necessarily match.

All packets subsequent to the SYN request to the same server will go through the same TCP header changes, i.e., the source IP and physical address are replaced by one of the IP address and physical address of the controller. The destination physical address is replaced by the physical address of the selected router. All the reply packets from the server go through the changes in reverse direction where the destination IP address and physical address is replaced with the IP and physical address of the client node on the LAN so that the packet reaches the proper node.

In some cases the SYN modifier 412 provides a modified SYN request when the request contains the IP address of a machine running the controller 202, and the response specifies the physical address of an identified router 110 which was selected by the router selector 406 instead of specifying the physical address of the machine running the controller 202. In some cases the SYN modifier 412 provides a modified SYN request when the request contains the IP address of a first identified router 110 (which may or may not be running the controller 202), and the response specifies the physical address of a second identified router 110 instead of specifying the physical address of the first identified router, the second identified router 110 having been selected by the router selector 406.

In conclusion, some of the advantageous features of the invention include the following. As noted, the invention divides requests (from the clients to a server on the Internet) over multiple paths. This includes multiple paths for single requests from applications like an HTTP URL request, FTP data transfer and also individual requests over individual router. This in turn permits load balancing and enhances security. The invention can balance the load over lines with varying available bandwidth. The response time for communication over a T1 line is faster than the response time for ISDN. Based on the response times, the invention can load a line with more or less data requests, and this can be done in real time. A user can specify the amount of load to be put on individual lines. If one line fails, the Internet connectivity of the LAN may be continued over the remaining connection(s), providing reliability and redundancy for the Internet connection. For cold fail-over, the user can have a standby communication line. They can specify that the standby line to become active when the primary connection fails. Since the invention provides multiple IP interfaces to the Internet, it enhances Internet communication security by transferring data streams over multiple lines.

Although particular methods and storage media embodying the present invention are expressly described herein, it will be appreciated that system embodiments may also be formed according to the configured media and methods of the present invention. Unless otherwise expressly indicted, the description herein of methods and/or configured media of the present invention therefore extends to corresponding systems, and the description of systems of the present invention extends likewise to corresponding methods and configured media.

As used herein, terms such as "a" and "the" and item designations such as "node" or "packet" are generally inclusive of one or more of the indicated item. In particular, in the claims a reference to an item normally means at least one such item is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A controller for combining routers to provide increased concurrency in external access to a computer network, the controller comprising:
   a router identifier for identifying at least two routers for a LAN, each identified router having its own IP address and its own physical address;
   a router selector for selecting between identified routers, the router selector making its selection in a manner which increases concurrent operation of identified routers by sending subsequent data requests and their corresponding responses through the selected router, thereby helping provide improved external access to the computer network through identified routers; and
   a SYN modifier which provides modified SYN requests that contain the address of an identified router, each response specifying the address of an identified router which was selected by the router selector.

2. The controller of claim 1, wherein the SYN modifier provides a modified SYN request that contains the IP address of a machine running the controller software, and the modified SYN packet specifies the physical address of an identified router selected by the router selector instead of specifying the physical address of the machine running the controller.

3. The controller of claim 1, wherein the SYN modifier provides a modified SYN request that contains the physical address of a machine running the controller, and the modified packet specifies the physical address of an identified router selected by the router selector instead of specifying the physical address of the machine running the controller.

4. The controller of claim 1, wherein the SYN modifier provides a SYN request that contains the IP address of a first identified router, and the modified SYN request specifies the physical address of a second identified router selected by the router selector instead of specifying the physical address of the first identified router.

5. The controller of claim 1, wherein the SYN modifies a SYN request that contains the physical address of a first identified router, and the modified SYN packet specifies the physical address of a second identified router selected by the router selector instead of specifying the physical address of the first identified router.

6. The controller of claim 1, wherein the controller divides requests from clients on a local area network to a server on a wide area network over multiple paths.

7. The controller of claim 1, wherein the controller receives IP packets and multiplexes traffic by sending different IP packets over different routers based on at least one of a TCP port number, a UDP port number, and a load balancing criterion.

8. The controller of claim 1, wherein a client connected to a wide area network requests information from a server node within a local area network, and the controller redirects the response from the local area network server by selecting a least loaded router.

9. The controller of claim 1, wherein the controller resides at a source local area network, another controller resides at a destination local area network, and an inquiry is sent from the source controller to the destination controller seeking at least one of a destination router IP address and an destination router physical address.

10. The controller of claim 9, wherein the source controller receives at least one requested destination router address and selects that router.

* * * * *